Aug. 8, 1933.  M. RICHARDSON  1,921,325
SLEEPING COMPARTMENT FOR AUTOMOBILES
Filed April 3, 1931  3 Sheets-Sheet 1
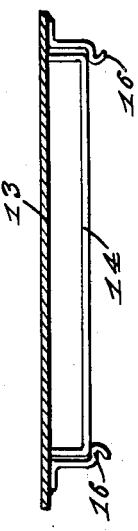
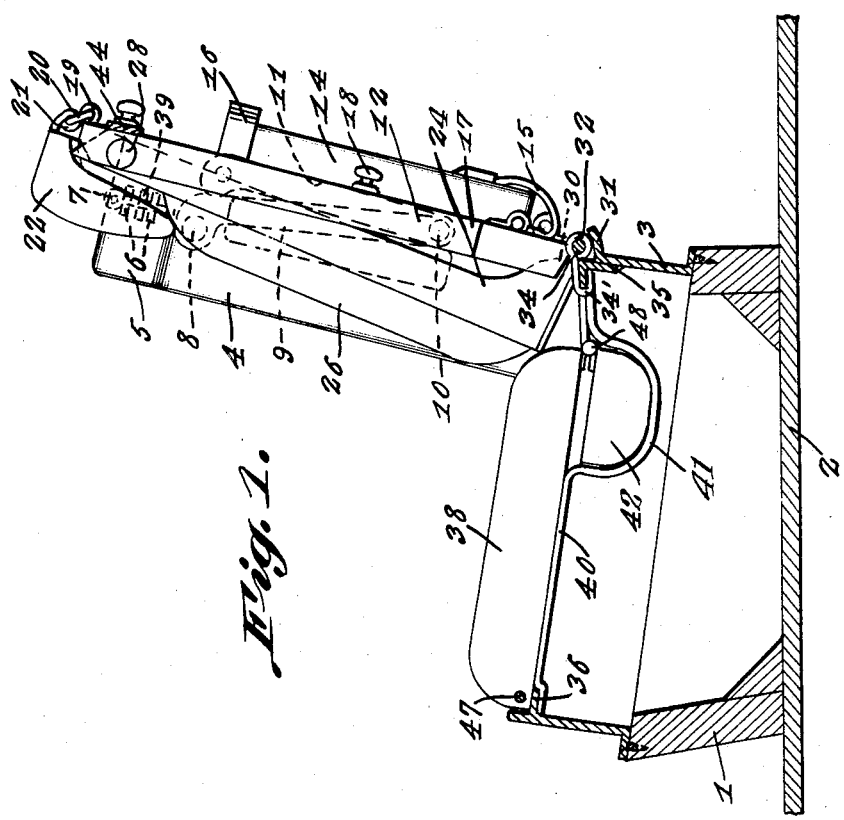
Mack Richardson, INVENTOR
BY
ATTORNEY

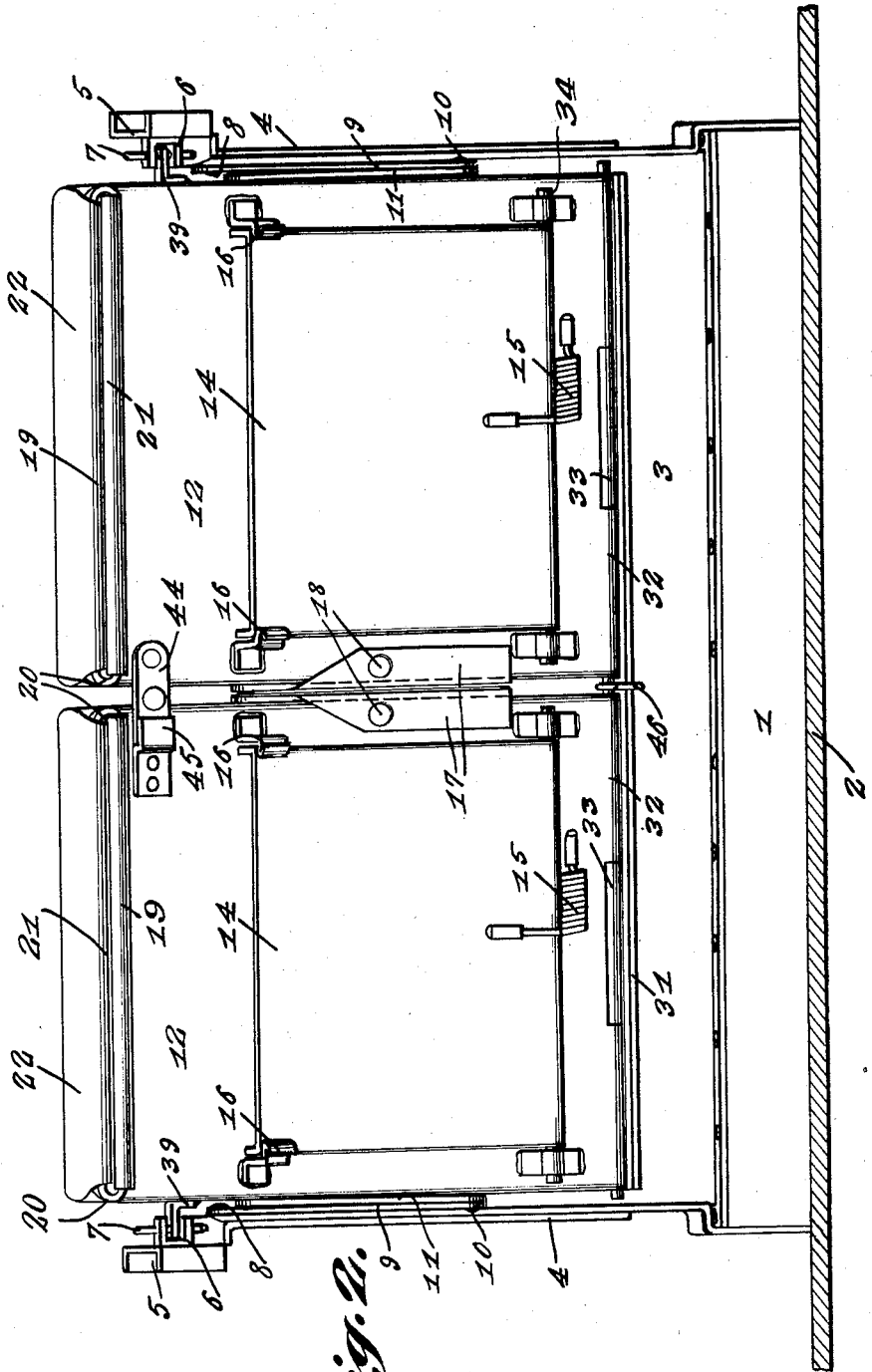

Aug. 8, 1933. M. RICHARDSON 1,921,325
SLEEPING COMPARTMENT FOR AUTOMOBILES
Filed April 3, 1931 3 Sheets-Sheet 3
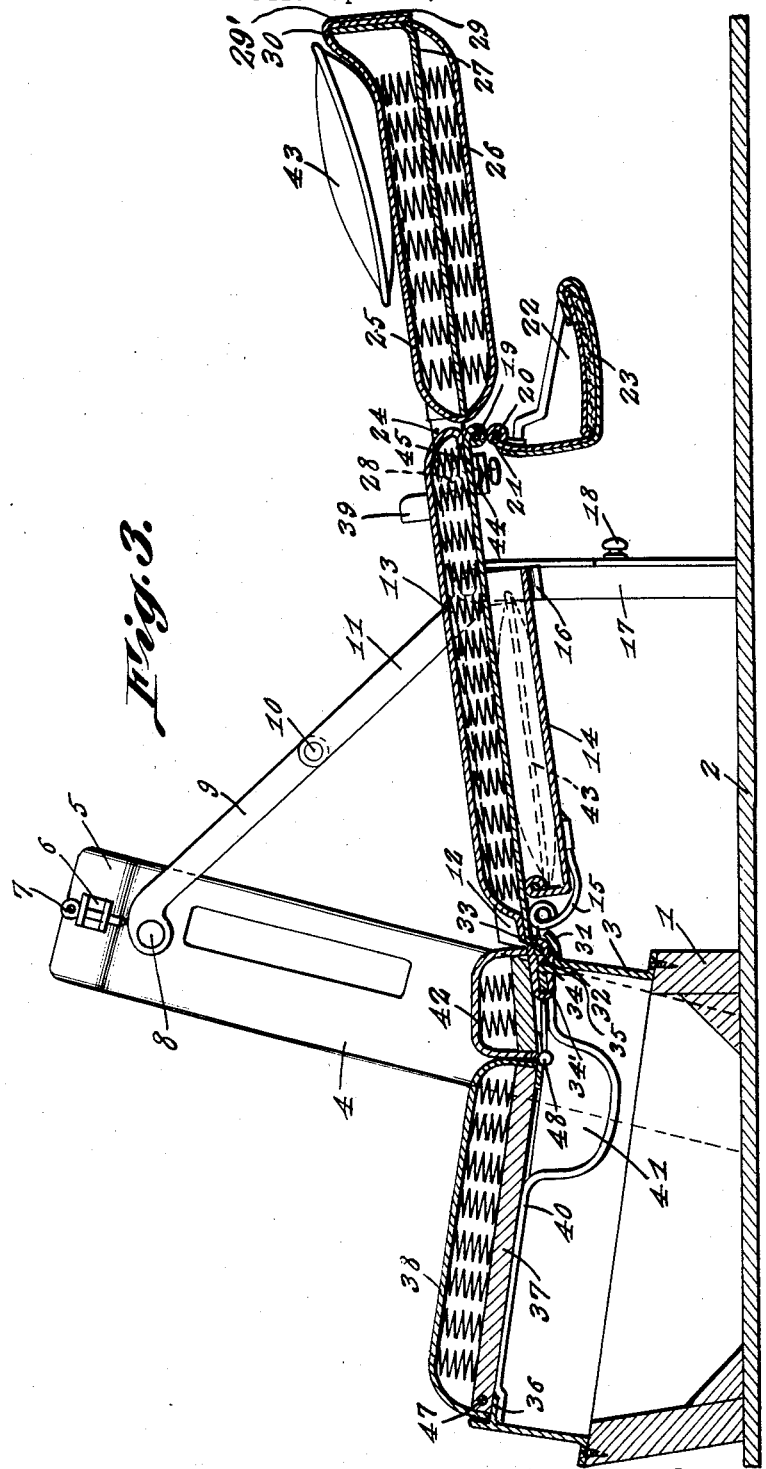
Mack Richardson INVENTOR
BY
ATTORNEY Patented Aug. 8, 1933

1,921,325

UNITED STATES PATENT OFFICE 1,921,325

SLEEPING COMPARTMENT FOR AUTOMOBILES

Mack Richardson, Homestead, Pa.

Application April 3, 1931. Serial No. 527,582

3 Claims. (Cl. 155—7)

My present invention has reference to a front seat for automobiles or like vehicles, and my primary object being the construction of a seat for this purpose which shall comprise a plurality of sections that may be swung outwardly with respect to each other in substantially horizontal alinement to provide a bed and which, when in their spread or in their folded positions will be firmly and effectively supported.

A still further object is the provision of a convertical front seat for automobiles that comprises sections arranged in separable pairs so that one of the occupants of the seat may drive the automobile or like vehicle, while the other rests or sleeps.

A further object is the provision of a seat for this purpose that is characterized by simplicity in construction, cheapness in manufacture and thorough efficiency in operation.

To the attainment of the foregoing the improvement resides in certain other novel features of construction, combination and operative association of parts, one satisfactory embodiment of which is disclosed by the accompanying drawings.

In the drawings:

Figure 1 is a side elevation of a combination seat and bed for automobiles in accordance with this invention, the base being in section.

Figure 2 is a rear elevation thereof.

Figure 3 is a longitudinal sectional view showing the seat converted into a bed.

Figure 4 is a detail sectional view through the rear of the frame for one of the back sections looking toward the open mouth of the casing or compartment.

The hollow wooden base 1 upon which the front seat of an automobile is supported is fixed to the floor 2 of the machine in the usual manner. The upper and open top of the base is inclined downwardly from its front to its back and on the said upper edge I secure the seat supporting frame 3 of the improvement. The frame 3 is preferably of metal and is of a size corresponding to that of the base 1.

Rigidly secured to the base 1, and also if desired, to the ends of the frame 3, adjacent to the rear thereof, are vertically disposed rearwardly inclined relatively wide plates in the nature of uprights which are indicated by the reference numeral 4. The uprights 4 have their upper ends offset to provide extensions 5. Secured to the confronting faces of the extensions 5 are substantially U-shaped brackets 6 which have alinged openings in the parallel arms thereof for the reception of removable headed pins 7. The pins are preferably connected to the offset ends by suitable flexible means, not shown, so that they will not be lost when removed from the brackets 6.

The uprights 4, on the inner faces thereof and below the brackets 6 have pivotally secured thereto as at 8, the offset upper ends of links 9 which have pivotally secured to their opposite ends as at 10, one of the ends of links 11, the latter having their other ends pivotally secured to the side members of the frames 12 of what may be termed the intermediate sections of my device, and the frames 12 each carry a cushion 13 as best shown in Figure 3. The frames 12 and the cushions 13 thereof provide a portion of the backs for the seat when the device is in upright position as shown in Figure 1, and intermediate reclining sections when the device is converted into a bed as shown in Figure 3. The frames 12 each include a back plate that has hingedly secured thereto a substantially rectangular casing 14 that is provided with an open inner face and top, and the inner faces of the casings 14 are disposed in confronting relation with respect to the backs as best shown in Figure 2. The casings 14 are normally held against the backs of the frames 12, through the medium of springs 15 which have one of their ends fixedly secured to the backs, while their opposite ends are secured to the casings 14, as clearly shown in Figure 2. These casings are designed to provide receptacles for pillows and bed clothes and are locked or held against the backs by spring catches 16.

Pivotally secured to the confronting sides of the frames 12 are leg members 17 which are in the nature of flange plates, and these plates have secured to the flanges thereof, knobs 18, whereby the plates may be swung against the confronting sides of the frame when the device is in upright position or swung to a position to contact with the floor board 2 of the vehicle when the device is arranged as a bed. The upper and rear end of the back of each of the frames 12 is rolled to provide the same with an eye or hinge barrel 19, and passing through the hinge barrel of each frame is one of the arms of substantially rectangular shaped wire members 20, the ends of which are rounded and the other arms of each of said wire members pass through hinge barrels 21 formed on one edge portion of the frames of head rests 22. The outer or active face of each head rest is padded as at 23, and the hinge connection provided by the wire members 20 between the frames 12 of the intermediate sections and the head rests permit the latter to be swung to an operative position when the device is set up in an upright position as shown in Figure 1, or swung to an out of the way position when the device is converted into a bed, as shown in Figure 3.

Auxiliary or extension cushion sections are employed in connection with the intermediate sections, and the auxiliary sections include side members 24 which are pivoted inwardly of the outer ends of the side members 12, as at 28. Each of the auxiliary sections includes an intermediate plate 27 which is secured to the outer or lower edge of the side members 24, and these plates afford rests or abutments for the coil springs of cushions 25 and 26 which are disposed upon the opposite sides of the plates 27, as clearly shown in Figure 3. The plate 27 of each auxiliary cushion section has its rear or outer end flanged upwardly, and the outer end of the face of the cushion 25 is rounded upwardly, while the side members 24 have the upper edges of their outer ends rounded accordingly, thus affording the rear of each of the auxiliary sections with an extension that I term a nose, and which is indicated by the reference numeral 30. Preferably the face portions of the cushions 25 and 26 are integral as shown in Figure 3, and the outer ends 29 of the face portions are secured to reinforcing plates 29' that are fixed to the flanges of the plates 27.

The rear wall of the base frame 3 has its upper edge formed with an upwardly and rearwardly rounded portion that is in the nature of a lip which is indicated by the reference numeral 31 and receives therein barrels or eyes 32 which are slotted or cut-away for a portion of their length to accommodate in the cut-away portions barrels or eyes 33. The barrels 32 are formed on what I term the lower or inner ends of the backs of the frame members 12 of the intermediate sections, and a pintle 34 passes through the said barrels or eyes as clearly shown in Figure 2. The barrels or eyes 32 are formed on one longitudinal edge of a plate which is bent upon itself to provide a hooked portion 34', and this hooked portion receives therein the horizontal flange of an angle bracket 35 which is fixed to the inner face of the rear wall of the frame 3 as best shown in Figure 1. By this arrangement, it will be obvious that the intermediate sections are removably connected with respect to the frame 3. The frame 3, at a suitable distance below its open top has formed thereon an inwardly directed flange 36, and resting upon this flange is the bottom plate 37 of the seat cushion 38 of the seat sections, as shown in Figures 1 and 2. The flange 36 may be integrally formed with the bracket flange 35, but it is noted that the seat cushion 38 does not fully cover the frame 3, there being a space between the bottom of the intermediate sections and the seat cushion 38. This space is occupied by the nose portions 30 of the auxiliary sections when the latter are swung upon their pivots 28 to bring the cushion portions 25 against the cushions 13 of the intermediate sections, and when in that position, the cushion portions 26 provide back rests for the occupants of the front seat of the vehicle. Due to the fact that the position of the pivots 28 is below the upper ends of the frames 12, a considerable space is left between the upper ends of the faces 26 and the top of the cushions 13, and this space is occupied by the head rests when the latter are in their operative position, as shown in Figure 1.

Secured to the outer faces of the frame 12 are angle brackets 39 that are provided with outwardly extending apertured ears adapted to be received between the arms of the substantially U-shaped brackets 6, with the apertures thereof registering with the openings of the arms for the purpose of receiving the pins 7 to hold the device in an upright position as best shown in Figure 2.

Fixed to the under face of the flange 36 as well as the horizontal flange of the bracket 35, is a plate 40 which is formed with a longitudinally arranged downwardly directed extension that provides a pocket 41 and this pocket is designed to receive therein filler cushion sections 42 which are employed to fill the gap between the seat cushion section 38 and the intermediate sections, when the device is arranged as a bed, as clearly shown in Figure 3. When the device is disposed to an upright position as shown in Figure 1, the filler cushion sections are arranged in the pocket.

Cooperating with the brackets 6 and 39, and the pins 7 in holding the device in upright position, I provide latching means which includes a latch member 44 which is pivotally secured to the back of one of the intermediate sections and is receivable in a keeper 45 that is secured to the back of the other intermediate section, as disclosed in Figure 2. It will also be noted from Figure 2, that I provide a bracket 46 which is fixed to the rear wall of the frame 3 and extends between the intermediate sections to be received by the pintle 34 to support the latter as will be apparent.

The bottom plate 37 of the cushion seat section is pivotally secured to the frame 3 through the medium of a suitable pivot member 47, and the filler cushion sections are hingedly secured to the rear end of the bottom plate 37 as at 48, with the result it will be merely necessary to swing the rear of the seat cushion section 38 upwardly to cause the filler cushions to swing downwardly to be received in the pocket 41, and the filler cushions are shown disposed in the pockets in Figure 1.

From the above description and disclosure of the drawings, it will be obvious that I have provided a convertible vehicle seat that is made up of a plurality of sections and either one or both of the intermediate and auxiliary sections together with the cooperating parts thereof, may be positioned to provide a bed for one or both of the occupants of the front seat of the vehicle. The device can be moved to either its upright or reclining positions in an easy and expeditious manner, and when in either position, will be held rigid, and will be comfortable. When in a reclining position as shown in Figure 3, the pillows and bed clothes can be removed from the casings 14 and disposed on the sections in the usual manner, and for the sake of illustration I have disclosed a pillow 43 in dotted lines, arranged in the casing 14, and in full lines received by an auxiliary section and disposed against the nose portion 30 thereof, as clearly shown in Figure 3.

It is thought from the foregoing description that the advantages and novel features of my invention will be readily apparent.

I desire it to be understood that I may make changes in the construction and in the combination and arrangement of the several parts, provided that such changes fall within the scope of the appended claims.—

Having thus described the invention, I claim:

1. A convertible vehicle seat comprising a base, rearwardly inclined uprights rising from said base, substantially U-shaped brackets extending inwardly from the upper ends of said uprights, a frame secured to and rising from the base, a pair of intermediate cushion sections hingedly connected to the frame, links connecting the intermediate sections with the uprights, brackets secured to the outer sides of the intermediate sections and receivable between the arms of the U-shape brackets, latching means carried by the intermediate sections, detachable means extending through companion brackets and cooperating with the latching means to hold the intermediate sections in an upright position, legs pivotally secured to the confronting faces of the intermediate sections to cooperate with the links in supporting the device in reclining position, auxiliary cushion sections pivotally secured adjacent to the ends of the intermediate sections and foldable upon the latter, head rests hingedly secured to the outer ends of the intermediate sections and foldable on the auxiliary sections, a seat cushion section detachably secured to the frame, said intermediate sections being spaced from the seat section, filler cushions hingedly secured to the seat section and arranged for disposal in the space between the seat section and the intermediate sections, and means secured to the frame and having a pocket to receive the filler cushions.

2. A convertible vehicle seat comprising a base, rearwardly inclined uprights rising from the sides of the base, a frame secured to and supported upon the base, an angle bracket secured to the frame, a plate including a hooked portion disposed about the bracket, hinge barrels formed on the plate, intermediate sections including back plates, hinge barrels formed on the back plates and cooperating with the first mentioned hinge barrels, means passing through the cooperating hinge barrels for hingedly connecting the intermediate sections to the frame, latching means for connecting the intermediate sections together, means having connection with the uprights and cooperating with the latching means for holding the device in upright position, auxiliary sections pivotally connected adjacent to the outer ends of the intermediate sections and foldable on the latter, head rests hingedly secured to the outer ends of the intermediate sections and foldable on the auxiliary sections, foldable means pivoted to the intermediate sections for holding the device in reclining position, a seat section pivotally connected with the frame, cushions included in each of the sections, the cushions of the intermediate section being spaced from the seat cushion, filler cushions hinged to the seat section and receivable in the space between the latter and the cushions for the intermediate sections, and a plate connected to the frame and being shaped to provide a pocket for the filler cushions when the device is disposed in an upright position.

3. A convertible vehicle seat comprising a base, uprights rising from the sides of said base, a frame secured to the top of said base, intermediate sections hingedly connected to said frame, links connecting the intermediate sections to the uprights, means for holding the intermediate sections in an upright position, means for supporting the intermediate sections in a reclining position, auxiliary sections pivotally connected adjacent to the outer ends of the intermediate sections, upwardly curved nose portions formed with the free ends of the auxiliary sections, head rests hingedly secured to the outer ends of the intermediate sections and foldable upon the auxiliary sections, cushions included in the intermediate and auxiliary sections, a seat section including a cushion and secured to the frame, said seat section being spaced from the intermediate sections, said auxiliary sections being foldable upon the intermediate sections, and the nose portions thereof being receivable in the space between the seat section and the intermediate sections when the device is in upright position, filler members for the space when the device is in a reclining position, and being hingedly secured to the seat section and means secured to the frame and including a pocket to receive the filler cushions.

MACK RICHARDSON.